(12) United States Patent
Goto et al.

(10) Patent No.: US 9,421,528 B2
(45) Date of Patent: Aug. 23, 2016

(54) EXHAUST GAS PURIFYING CATALYST AND EXHAUST GAS PURIFICATION METHOD USING SAME

(71) Applicant: UMICORE SHOKUBAI JAPAN CO., LTD., Tokoname-shi, Aichi (JP)

(72) Inventors: Yosuke Goto, Tokoname (JP); Naohiro Kato, Tokoname (JP); Yuta Akasaka, Tokoname (JP); Shota Kawashima, Tokoname (JP)

(73) Assignee: UMICORE SHOKUBAI JAPAN CO., LTD., Aichi (JP)

( * ) Notice: Subject to any disclaimer, the term of this patent is extended or adjusted under 35 U.S.C. 154(b) by 0 days.

(21) Appl. No.: 14/770,043
(22) PCT Filed: Feb. 24, 2014
(86) PCT No.: PCT/JP2014/054387
§ 371 (c)(1),
(2) Date: Aug. 24, 2015
(87) PCT Pub. No.: WO2014/129634
PCT Pub. Date: Aug. 28, 2014

(65) Prior Publication Data
US 2016/0001275 A1     Jan. 7, 2016

(30) Foreign Application Priority Data

Feb. 25, 2013   (JP) ................................ 2013-034837

(51) Int. Cl.
*B01D 53/56* (2006.01)
*B01D 53/94* (2006.01)
(Continued)

(52) U.S. Cl.
CPC ........... *B01J 29/7415* (2013.01); *B01D 53/944* (2013.01); *B01J 29/7007* (2013.01);
(Continued)

(58) Field of Classification Search
CPC .......... B01J 21/04; B01J 21/06; B01J 21/063; B01J 21/066; B01J 21/08; B01J 23/10; B01J 23/63; B01D 53/56; B01D 53/94

USPC ........ 502/258–263, 302–304, 327, 332–334, 502/339, 349–351, 355, 439; 423/213.5
See application file for complete search history.

(56) References Cited

U.S. PATENT DOCUMENTS

| | | | | |
|---|---|---|---|---|
| 4,367,162 A | * | 1/1983 | Fujitani ................ | B01D 53/945 423/213.5 |
| 4,727,052 A | * | 2/1988 | Wan ...................... | B01D 53/945 502/304 |

(Continued)

FOREIGN PATENT DOCUMENTS

| | | |
|---|---|---|
| JP | 2000-197819 | 7/2000 |
| JP | 2007-275878 A | 10/2007 |

(Continued)

OTHER PUBLICATIONS

International Preliminary Report on Patentability and Written Opinion of the International Searching Authority (Forms PCT/IB373 and PCT/ISA1237) issued on Sep. 3, 2015, by the International Bureau of WIPO, in corresponding International Application No. PCT/JP2014/054387. (15 pages).

(Continued)

*Primary Examiner* — Cam N. Nguyen
(74) *Attorney, Agent, or Firm* — Buchanan Ingersoll & Rooney PC

(57) ABSTRACT

A catalyst that is not only capable of efficiently treating CO even at a low exhaust gas temperature, but also capable of exerting favorable CO purification efficiency in a low-temperature exhaust gas even in a case of being exposed for a long time to an engine exhaust gas that is a high temperature and contains HC, CO, NOx, water vapor and the like; and an exhaust gas treatment technique are described. The catalyst for purifying exhaust gas contains: a noble metal; an oxide containing as a base material A at least two kinds of elements selected from the group consisting of aluminum, zirconium and titanium; and an oxide containing as a base material B at least one kind of element selected from the group consisting of silicon, cerium, praseodymium and lanthanum; in which the base material A and the base material B satisfy a specific formula.

4 Claims, 2 Drawing Sheets

AZS SiO₂ Amount change

(51) Int. Cl.
  *B01J 21/00* (2006.01)
  *B01J 21/04* (2006.01)
  *B01J 23/00* (2006.01)
  *B01J 23/02* (2006.01)
  *B01J 23/08* (2006.01)
  *B01J 23/10* (2006.01)
  *B01J 23/40* (2006.01)
  *B01J 23/42* (2006.01)
  *B01J 23/44* (2006.01)
  *B01J 23/56* (2006.01)
  *B01J 29/74* (2006.01)
  *B01J 37/02* (2006.01)
  *B01J 35/00* (2006.01)
  *B01J 29/70* (2006.01)
  *B01J 23/63* (2006.01)

(52) U.S. Cl.
  CPC ......... B01J35/0006 (2013.01); B01J 37/0244 (2013.01); B01J 37/0246 (2013.01); *B01D 2255/1021* (2013.01); *B01D 2255/1023* (2013.01); *B01D 2255/2063* (2013.01); *B01D 2255/2065* (2013.01); *B01D 2255/2066* (2013.01); *B01D 2255/2092* (2013.01); *B01D 2255/20707* (2013.01); *B01D 2255/20715* (2013.01); *B01D 2255/30* (2013.01); *B01D 2255/502* (2013.01); *B01D 2255/9207* (2013.01); *B01D 2257/502* (2013.01); *B01D 2258/012* (2013.01); *B01J 23/44* (2013.01); *B01J 23/63* (2013.01); *F01N 2610/05* (2013.01); *F01N 2900/1621* (2013.01)

(56) References Cited

U.S. PATENT DOCUMENTS

| | | | | |
|---|---|---|---|---|
| 6,326,329 B1* | 12/2001 | Nunan | B01D 53/945 | 502/242 |
| 6,459,897 B2* | 10/2002 | Holmes | H04W 68/12 | 455/426.1 |
| 6,576,207 B1* | 6/2003 | Mussmann | B01D 53/945 | 423/212 |
| 6,797,668 B2* | 9/2004 | Yoshikawa | B01D 53/945 | 502/302 |
| 6,808,687 B1* | 10/2004 | Uenishi | B01D 53/945 | 422/177 |
| 7,081,430 B2* | 7/2006 | Uenishi | B01D 53/945 | 502/304 |
| 7,205,257 B2* | 4/2007 | Tanaka | B01D 53/945 | 502/302 |
| 7,307,039 B2* | 12/2007 | Iwakuni | B01D 53/945 | 502/302 |
| 7,341,975 B2* | 3/2008 | Iwakuni | B01D 53/945 | 502/304 |
| 7,344,683 B2* | 3/2008 | Miyoshi | B01D 53/945 | 422/172 |
| 7,384,888 B2* | 6/2008 | Kuno | B01D 53/945 | 502/302 |
| 7,576,029 B2* | 8/2009 | Saito | B01D 53/945 | 502/302 |
| 7,759,279 B2* | 7/2010 | Shiratori | B01D 53/945 | 502/303 |
| 7,842,642 B2* | 11/2010 | Tanabe | B01D 53/945 | 502/302 |
| 7,863,217 B2* | 1/2011 | Minoshima | B01D 53/945 | 502/302 |
| 7,943,104 B2* | 5/2011 | Kozlov | B01D 53/945 | 423/212 |
| 7,964,527 B2* | 6/2011 | Larcher | B01D 53/945 | 423/213.2 |
| 8,158,554 B2* | 4/2012 | Wakamatsu | B01D 53/945 | 502/252 |
| 8,227,374 B2* | 7/2012 | Sato | B01D 53/945 | 502/100 |
| 8,309,487 B2* | 11/2012 | Shiratori | B01D 53/945 | 502/242 |
| 8,465,711 B2* | 6/2013 | Ikeda | B01D 53/945 | 423/213.5 |
| 8,545,780 B1* | 10/2013 | Chen | B01D 53/945 | 423/213.2 |
| 8,580,705 B2* | 11/2013 | Aoki | B01D 53/945 | 502/304 |
| 8,673,809 B2* | 3/2014 | Nakatsuji | B01D 53/945 | 502/302 |
| 8,679,411 B2* | 3/2014 | Akamine | B01J 37/0244 | 422/171 |
| 8,728,435 B2* | 5/2014 | Larcher | B01D 53/945 | 423/594.12 |
| 8,833,064 B2* | 9/2014 | Galligan | B01D 53/945 | 423/213.5 |
| 8,852,519 B2* | 10/2014 | Watanabe | B01D 53/945 | 422/177 |
| 8,999,886 B2* | 4/2015 | Takeshima | B01D 53/945 | 502/302 |
| 9,011,809 B2* | 4/2015 | Ito | B01D 53/9436 | 422/170 |
| 9,034,286 B2* | 5/2015 | Bergeal | B01D 53/945 | 422/180 |
| 2007/0219089 A1 | 9/2007 | Goto | | |
| 2010/0186375 A1 | 7/2010 | Kazi et al. | | |
| 2011/0245075 A1 | 10/2011 | Ohmura et al. | | |
| 2011/0274603 A1 | 11/2011 | Kohara et al. | | |
| 2014/0030158 A1 | 1/2014 | Takagi et al. | | |
| 2014/0072493 A1 | 3/2014 | Kato et al. | | |

FOREIGN PATENT DOCUMENTS

| | | |
|---|---|---|
| JP | 2011-083765 A | 4/2011 |
| JP | 2012-071235 | 4/2012 |
| JP | 2012-515087 A | 7/2012 |
| WO | WO 2010-103870 A1 | 9/2010 |
| WO | WO 2012/121085 A1 | 9/2012 |
| WO | WO 2012/137930 A1 | 10/2012 |

OTHER PUBLICATIONS

International Search Report (PCT/ISA/210) mailed on May 13, 2014, by the Japanese Patent Office as the International Searching Authority for International Application No. PCT/JP2014/054387. (8 pages).
Written Opinion (PCT/ISA/237) mailed on May 13, 2014, by the Japanese Patent Office as the International Searching Authority for International Application No. PCT/JP2014/054387. (5 pages).
Office Action (Notification of Reason for Refusal) issued on Feb. 9, 2016, by the Japanese Patent Office in Corresponding Japanese Patent Application No. 2015-501538 and an English Translation of the Office Action. (8 pages).

* cited by examiner

EXHAUST GAS PURIFYING CATALYST AND EXHAUST GAS PURIFICATION METHOD USING SAME

TECHNICAL FIELD

The present invention relates to a catalyst for purifying exhaust gas, and to a purification method of exhaust gas using the catalyst. In particular, the present invention relates to a catalyst for purifying the exhaust gas discharged from a gasoline engine, and a diesel engine, and to an exhaust gas purification method using the catalyst.

BACKGROUND ART

As to a treatment technique of the exhaust gas generated from an internal-combustion engine, many techniques have been proposed conventionally. In particular, as to an exhaust gas treatment from a diesel engine, various techniques have been proposed for the purpose of reduction of exhaust of the particulate matter (PM) and NOx contained in exhaust gas. For example, as a catalyst for purifying exhaust gas, an oxidation catalyst that oxidizes a carbon monoxide (hereinafter, also referred to as "CO") and a hydrocarbon (hereinafter, also referred to as "HC") to $CO_2$ or $H_2O$, a NOx storage catalyst that stores a nitrogen oxide (hereinafter, also referred to as "NOx"), further, a three way catalyst that removes NOx, CO, and HC at the same time, and the like have been proposed.

In recent years, due to the strengthening of the regulations on exhaust gas, a CO treatment technique that is efficient at a low temperature of exhaust gas is desired, and for example, a technique that improves CO treatment efficiency at a low temperature by using an alumina, an oxide such as zirconia or ceria, having a fine particle diameter, and a noble metal such as platinum in combination has been proposed (Patent Literature 1). As another technique, a technique that can effectively treat CO by a noble metal, and a complex oxide of aluminum and zirconium or a complex oxide of aluminum, zirconium and titanium even at a low exhaust gas temperature has been proposed (Patent Literature 2). It has been disclosed that the noble metal is preferably palladium having a nano-order particle diameter, and the smaller the particle of palladium is, the better performance of the CO purification at a low temperature it get.

CITATION LIST

Patent Literature

Patent Literature 1: International Publication WO 2012/121085
Patent Literature 2: International Publication WO 2012/137930

SUMMARY OF INVENTION

Technical Problem

An object of the present invention is to provide a catalyst for purifying exhaust gas, which can effectively perform an exhaust gas treatment, particularly CO purification even at a low exhaust gas temperature, and an exhaust gas purification method using the catalyst.

Another object of the present invention is to provide a catalyst for purifying exhaust gas, which can maintain and exert high CO activity particularly even when being exposed to exhaust gas at a high temperature for a long time, and an exhaust gas purification method using the catalyst.

Solution to Problem

The above-described various objects are solved by the provision of the following (1): a catalyst for purifying exhaust gas, containing a noble metal; an oxide containing as a base material A at least two kinds of elements selected from the group consisting of aluminum, zirconium and titanium; and an oxide containing as a base material B at least one kind of element selected from the group consisting of silicon, cerium, praseodymium and lanthanum; in which a base material ratio represented by the following Equation (X):

[Mathematical Expression 1]

$$\frac{\text{Weight of base material } B \text{ in terms of oxide}}{\text{Weight in base material } A \text{ in terms of oxide} + \text{Weight of base material } B \text{ in terms of oxide}} \times 100 \quad (X)$$

is (a) 0.01 to 8% by weight when the base material B is silicon, (b) 0.01 to 2% by weight when the base material B is cerium, (c) 0.01 or more to less than 2% by weight when the base material B is praseodymium, and (d) 0.01 to 10% by weight when the base material B is lanthanum. Further, the objects are solved by the provision of an exhaust gas purification method, using the catalyst for purifying exhaust gas described in (1).

Advantageous Effects of Invention

According to the present invention, a catalyst for purifying exhaust gas, which can effectively perform an exhaust gas treatment, particularly CO purification even at a low exhaust gas temperature, and an exhaust gas purification method using the catalyst can be provided.

Further, according to the present invention, a catalyst for purifying exhaust gas, which even when being exposed to high temperature exhaust gas (in particular, engine exhaust gas) (in particular, HC, CO, NOx, water vapor and the like are contained), particularly for a long time, can maintain and exert high CO activity (in particular, in low-temperature exhaust gas), and an exhaust gas purification method using the catalyst can be provided.

DESCRIPTION OF EMBODIMENTS

Figure 1:
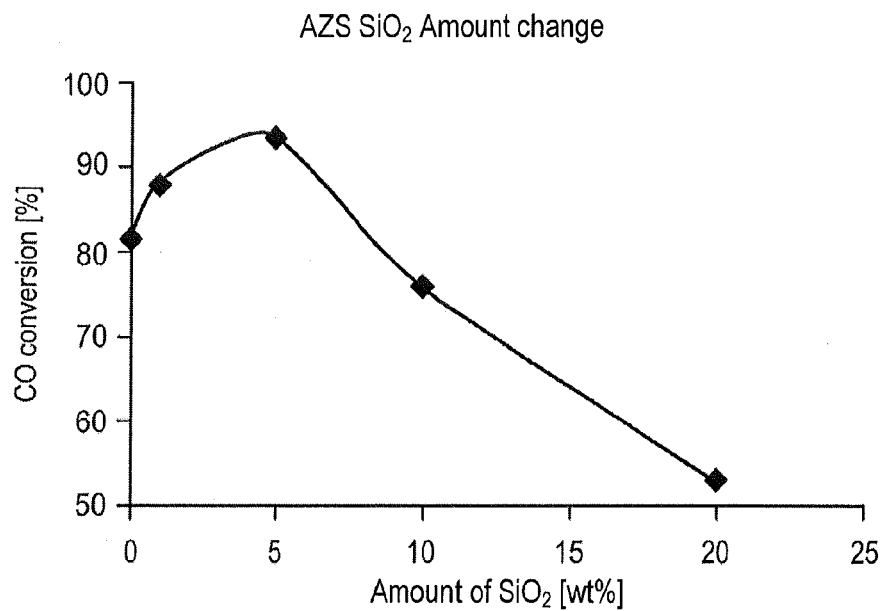
FIG. 1 is a graph showing the evaluation of a catalyst in which silica is added.

Hereinafter, the embodiment of the present invention will be described. Further, the present invention is not limited only to the following embodiments. In addition, in the present specification, "X to Y" showing a range means "X or more to Y or less", and "weight" and "mass", "% by weight" and "% by mass", and "parts by weight" and "parts by mass", are treated as synonyms. Further, unless otherwise noted, the operation, and the measurement of properties and the like are performed under the conditions at a room temperature (20 to 25° C.)/at a relative humidity of 40 to 50%.

The first of the present invention is the following (1): a catalyst for purifying exhaust gas, containing a noble metal; an oxide containing as a base material A at least two kinds of elements selected from the group consisting of aluminum, zirconium and titanium; and an oxide containing as a base material B at least one kind of element selected from the group consisting of silicon, cerium, praseodymium and lanthanum, in which a base material ratio represented by the following Equation (X):

[Mathematical Expression 2]

$$\frac{\text{Weight of base material } B \text{ in terms of oxide}}{\text{Weight in base material } A \text{ in terms of oxide} + \text{Weight of base material } B \text{ in terms of oxide}} \times 100 \quad (X)$$

is (a) 0.01 to 8% by weight when the base material B is silicon, (b) 0.01 to 2% by weight when the base material B is cerium, (c) 0.01 or more to less than 2% by weight when the base material B is praseodymium, and (d) 0.01 to 10% by weight when the base material B is lanthanum.

Further, in the present specification, "catalyst for purifying exhaust gas" is also referred to as "catalyst". In addition, in the "oxide" in "an oxide containing as a base material A at least two kinds of elements selected from the group consisting of aluminum, zirconium and titanium" an oxide of base material B is not included.

As described above, in the catalyst for purifying exhaust gas, by containing as a base material B at least one kind of element selected from the group consisting of silicon, cerium, praseodymium and lanthanum in a specific amount, the heat of exhaust gas is suppressed, and further, by oxidizing HC and the like, the sintering generated due to the movement of PGM (precious group of metals, noble metals), which is promoted by the heat due to the local high temperature on a surface of a catalyst is suppressed. Further, by ensuring the CO reaction site of PGM due to the electronic interaction that suppresses HC poisoning to a PGM active point, an exhaust gas treatment, particularly CO purification can effectively be performed even at a low exhaust gas temperature. Accordingly, even when being exposed to high temperature exhaust gas (in particular, engine exhaust gas) (in particular, HC, CO, NOx, water vapor and the like are contained), particularly for a long time, high CO activity (in particular, in low-temperature exhaust gas) can be maintained and exerted. However, the mechanism described above is only a presumption, and the technical scope of the present invention is not limited by the mechanism.

According to the present invention, preferred embodiments of the following (2) to (14) are provided.

(2) The catalyst described in (1), in which the noble metal is at least one kind selected from the group consisting of gold, silver, platinum, palladium, rhodium, iridium, ruthenium and osmium.

(3) The catalyst described in (1) or (2), in which the noble metal is at least one kind selected from the group consisting of platinum, palladium, rhodium and iridium.

(4) The catalyst described in any one of (1) or (3), in which the noble metal is at least one kind selected from the group consisting of platinum, palladium and rhodium.

(5) The catalyst described in any one of (1) or (4), in which the amount of the noble metal is 0.5 to 20% by weight when total amount (in terms of oxide) of the base material A and the base material B is set as 100% by weight.

(6) The catalyst described in any one of (1) or (5), in which the oxide of the base material A is a mixed oxide or complex oxide of the two kinds of elements.

(7) The catalyst for purifying exhaust gas described in any one of (1) or (6), in which an oxide of the aluminum as the base material A, and an oxide of the zirconium as the base material A, are contained.

(8) The catalyst for purifying exhaust gas described in (7), in which the oxide of the zirconium is 0.1 to 20% by weight when total weight (in terms of oxide) of the base material A is set as 100% by weight.

(9) The catalyst for purifying exhaust gas described in (7) or (8), in which an oxide of the titanium as the base material A is further contained.

(10) The catalyst for purifying exhaust gas described in (9), in which the oxide of the titanium is 0.1 to 20% by weight when total weight (in terms of oxide) of the base material A is set as 100% by weight.

(11) The catalyst for purifying exhaust gas described in any one of (1) to (10), in which the noble metal, the oxide of the base material A, and the oxide of the base material B are supported on a three-dimensional structure body that is a support.

(12) The catalyst for purifying exhaust gas described in any one of (1) to (11), in which other additive components are further contained.

(13) The catalyst for purifying exhaust gas described in (12), in which the other additive component is zeolite.

(14) The catalyst for purifying exhaust gas described in (12) or (13), in which the other additive component is supported on a three-dimensional structure body that is a support.

(15) The catalyst for purifying exhaust gas described in any one of (12) to (14), in which the other additive component is contained in an amount of 1 to 150 g per liter of the support.

(16) An exhaust gas purification method, using the catalyst for purifying exhaust gas described in any one of (1) to (15).

—Catalyst for Purifying Exhaust Gas—

(Noble Metal)

A noble metal used in the catalyst according to the present invention is preferably one or more kinds selected from the group consisting of gold (Au), silver (Ag), platinum (Pt), palladium (Pd), rhodium (Rh), iridium (Ir), ruthenium (Ru) and osmium (Os). These may be used alone, or in combination of two or more kinds thereof, and are preferably platinum, palladium, rhodium and iridium, and more preferably platinum, palladium and rhodium.

In a case of the combination of two kinds, from the viewpoint of the improvement of the HC and CO oxidation performance, platinum, and palladium are suitably used. When the catalyst components are platinum and palladium, the weight ratio of the platinum and the palladium is preferably 50:1 to 1:1, more preferably 40:1 to 1:1, still more preferably 30:1 to 1.1:1, further still more preferably 20:1 to 1.3:1, and most preferably 5:1 to 1.5:1. As the range of the weight ratio of the platinum and the palladium is more preferred, a CO purification efficiency improving effect is more exerted.

The use amount of the noble metal is preferably 0.01 to 20 g, more preferably 0.05 to 10 g, and most preferably 0.3 to 10 g per liter of support in terms of a noble metal. Further, in a case of the combination of two or more kinds, the total amount is prefer'ably within the above-described range.

The amount of the noble metal per 100 parts by weight of the total amount (in terms of oxide) of the base material A and the base material B is 0.01 to 100 parts by weight, preferably 0.1 to 50 parts by weight, more preferably 0.5 to 20 parts by weight, and still more preferably 0.8 to 3 parts by weight. This is because when the amount is less than 0.01 part by weight, there is a fear that the catalyst performance becomes decreased, and on the other hand, when the amount exceeds 100 parts by weight, the high temperature tolerance is easily decreased.

As a noble metal source, a raw material that is usually used may be used, noble metal black, a water-soluble noble metal salt, a noble metal complex, noble metal colloid or the like may be used, and these can be changed to be used depending on a method of preparing a catalyst.

Specific examples of the preferred raw material of a noble metal include, in a case of platinum, a halide such as platinum bromide and platinum chloride; inorganic salts such as a hexahydroxo acid salt, and a tetranitro acid salt of platinum; a carboxylate such as an acetate; and a hydroxide, a halide such as tetraammine platinum, and hexaammine platinum; inorganic salts; a carboxylate; and a hydroxide, an alkoxide, dinitrodiammine platinum and an oxide. Preferred examples include a nitrate, a carboxylate, a hydroxide and a hexahydroxo acid salt of dinitrodiammine platinum, tetraammine platinum and hexammine platinum, and a nitrate, a carboxylate, a hydroxide and a hexahydroxo acid salt of dinitrodiammine platinum, tetraammine platinum and hexammine platinum, and the like are particularly suitable.

Examples in a case of palladium include a halide such as palladium chloride; inorganic salts such as a nitrate and a sulfate of palladium; a carboxylate such as an acetate; and a hydroxide, a halide of tetraammine palladium and hexaammine palladium; inorganic salts; a carboxylate; and a hydroxide, an alkoxide, dinitrodiammine palladium, and an oxide. Preferred examples include a nitrate, a nitrate of dinitrodiammine palladium, tetraammine palladium and hexaammine palladium; a carboxylate; and a hydroxide, and a nitrate (palladium nitrate), a nitrate of tetraammine palladium and hexaammine palladium; a carboxylate; and a hydroxide.

Examples in a case of rhodium include rhodium; a halide such as rhodium chloride; inorganic salts such as a nitrate, a sulfate, a hexammine salt and a hexacyano acid salt of rhodium; a carboxylate such as an acetate; and a hydroxide, an alkoxide and an oxide. Preferred examples include a nitrate and a hexammine salt, and a nitrate (rhodium nitrate).

(Base Material A)

A base material A is at least two kinds' of elements selected from the group consisting of aluminum, zirconium and titanium. When the base material A is composed of only one kind, there is a problem that the heat resistance is decreased.

As described above, the base material A is at least two kinds of elements, and in a catalyst for purifying exhaust gas of the present invention, the base material A is used in a form of an oxide. The oxide of the base material A may be in any combination of oxides of aluminum, zirconium and titanium, however, when the catalyst of the present invention contains the combination of an oxide of aluminum and an oxide of zirconium, this is preferred from the viewpoint of the improvement of the heat resistance.

The ratio of the base material A may be any ratio as long as the base material A acts as a catalyst, however, if the amount of an oxide of the zirconium is 0.1 to 20% by weight when total weight (in terms of oxide) of the base material A is set as 100% by weight, this is preferred from the viewpoint of the improvement of the heat resistance.

Further, when in addition to the oxide of aluminum as the base material A, and the oxide of the zirconium as the base material A, the oxide of the titanium as the base material A is further contained, this is preferred from the viewpoint of the improvement of the heat resistance. In addition, if the amount of an oxide of the titanium is 0.1 to 20% by weight when total weight (in terms of oxide) of the base material A is set as 100% by weight, this is preferred from the improvement of the heat resistance.

In addition, as described above, the ratio (in terms of oxide) of the base material A may be any ratio as long as the base material A acts as a catalyst, however, in consideration of the high specific surface area, and the high temperature heat resistance, more specifically, $Al_2O_3$ is preferably 60 to 96% by weight, $ZrO_2$ is preferably 4 to 20% by weight and $TiO_2$ is preferably 0 to 20% by weight when total weight (in terms of oxide) of the base material A is set as 100% by weight. Further, from the viewpoint of the heat resistance, $Al_2O_3$ is more preferably 70 to 97% by weight, $ZrO_2$ is more preferably 2.5 to 20% by weight and $TiO_2$ is more preferably 1.5 to 10% by weight. Furthermore, from the viewpoint of the heat resistance, $Al_2O_3$ is still more preferably 75 to 95% by weight, $ZrO_2$ is still more preferably 3 to 20% by weight and $TiO_2$ is still more preferably 2 to 5% by weight.

Further, in a case where an oxide of titanium as the base material A is contained in addition to an oxide of aluminum as the base material A, and an oxide of zirconium as the base material A, the oxide of the zirconium (% by weight)/the oxide of the titanium (% by weight) is, from the viewpoint of the improvement of the heat resistance, preferably 1.2 to 3.0, more preferably 1.4 to 2.6 and furthermore preferably 1.6 to 2.3.

Herein, as the aluminum (Al) source, aluminum sulfate (a sulfate), aluminum nitrate (a nitrate), aluminum hydrochloride (a hydrochloride), aluminum acetate (an acetate), or the like, which becomes alumina by calcination, can be used in addition to alumina such as γ alumina, δ alumina and θ alumina, and the aluminum source is preferably aluminum nitrate. Further, these may be a form of hydrate. In addition, an aluminum source having a hydroxyl group, such as boehmite can also be used.

As the zirconium (Zr) source, zirconyl sulfate (a sulfate), zirconyl nitrate (a nitrate), zirconyl hydrochloride (a hydrochloride), zirconyl acetate (an acetate), zirconyl carbonate (a carbonate), zirconyl chloride (a chloride) or zirconyl hydroxide (a hydroxide), which becomes zirconia by calcination, can be used in addition to an oxide such as zirconia, and zirconia sol. These are preferably used in a form of an aqueous solution.

As the titanium (Ti) source, titanium sulfate (a sulfate), titanium chloride (a chloride) and titanium alkoxide, which becomes an oxide by calcination, can be used in addition to an oxide such as titania, and titania sol.

(Base Material B)

A base material B is at least one kind of element selected from the group consisting of silicon, cerium, praseodymium and lanthanum, these can also be used in combination. In a catalyst for purifying exhaust gas of the present invention, the base material B is used in a form of an oxide.

(a) When the base material B is silicon, base material ratio (X):

[Mathematical Expression 3]

$$\frac{\text{Weight of base material } B \text{ in terms of oxide}}{\text{Weight in base material } A \text{ in terms of oxide} + \text{Weight of base material } B \text{ in terms of oxide}} \times 100 \quad (X)$$

is 0.01 to 8% by weight. When the base material ratio is less than 0.01% by weight, there is a problem that the ignition temperature of CO (CO conversion rate 50% temperature, CO ignitability) is increased, and the CO conversion rate is decreased. On the other hand, in a case where the base material ratio exceeds 8% by weight, there is a problem that the CO conversion rate is decreased. The base material ratio when the base material B is silicon is, from the viewpoint of the improvement of the CO purification performance at a low temperature, preferably 0.07 to 6% by weight, more preferably 0.08 to 5% by weight, and still more preferably 1 to 5%.

Further, as a silicon source, silicon oxide or a salt thereof, orthosilicic acid or a salt thereof, metasilicic acid or a salt thereof, silica sol or the like can be used. In addition, as a salt, sodium, potassium and the like are particularly suitable.

(b) When the base material B is cerium, the base material ratio is 0.01 to 2% by weight. When the base material ratio is outside the range, the CO ignitability is decreased. The base material ratio when the base material B is cerium is, from the viewpoint of the improvement of the CO purification performance at a low temperature, preferably 0.3 to 1.7% by weight, and more preferably 0.5 to 1.5% by weight.

Further, as a cerium source, cerium oxide, ceriumnitrate, cerium sulfate, cerium carbonate or the like can be used. These may be a form of hydrate.

(c) When the base material B is praseodymium, the base material ratio is 0.01 or more to less than 2% by weight. When the base material ratio is outside the range, the CO ignitability is decreased. The base material ratio when the base material B is praseodymium, is, from the viewpoint of the improvement of the CO purification performance at a low temperature, preferably 0.2 to 1.7% by weight, and more preferably 0.7 to 1.3.

Further, as a praseodymium source, praseodymium oxide, praseodymium nitrate, praseodymium sulfate, praseodymium carbonate or the like can be used. These may be a form of hydrate.

(d) When the base material B is lanthanum, the base material ratio is 0.01 to 10% by weight. When the base material ratio is outside the range, the CO ignitability is decreased. The base material ratio when the base material B is lanthanum is, from the viewpoint of the improvement of the CO purification performance at a low temperature, preferably 0.5 to 9% by weight, and more preferably 3 to 6% by weight.

In addition, as a lanthanum source, lanthanum oxide, lanthanum nitrate, lanthanum sulfate, lanthanum carbonate or the like can be used. These may be a form of hydrate.

(Specific Surface Area of Base Material a and Base Material B)

In the present invention, as a catalyst component of a catalyst for purifying exhaust gas, an oxide containing at least two kinds of elements (base material A) selected from the group consisting of aluminum, zirconium and titanium, and an oxide containing at least one kind of element (base material B) selected from the group consisting of silicon, cerium, praseodymium and lanthanum are contained. Further, the oxide of the base material A and the oxide of the base material B may be a mixture (mixed oxide) or a complex oxide, however, is preferably a mixture (mixed oxide) from the viewpoints of the improvement of the CO purification performance at a low temperature and the maintenance of durability.

In addition, the specific surface area of the base material A and the base material B (total specific surface area of base material A and base material B) is, although the base material A and the base material B are not particularly limited as long as being usually used as a catalyst for treating exhaust gas, independently preferably 100 to 250 $m^2/g$, more preferably 150 to 250 $m^2/g$, still more preferably 160 to 250 $m^2/g$, and most preferably 180 to 250 $m^2/g$. Further, in a case where the specific surface area is less than 100 $m^2/g$, there is a fear that the high temperature durability is easily decreased, and when the specific surface area exceeds 250 $m^2/g$, there is a fear that the CO purification rate is easily decreased. In addition, in the present specification, the value of specific surface area means a value measured by a BET (Brunauer-Emmett-Teller) method using $N_2$ gas.

Herein, the preparation methods of (an oxide of) the base material A and (an oxide of) the base material B are not particularly limited as long as exerting an action effect of the present invention, however, (1) a method in which each oxide is sufficiently mixed into each other in a predetermined amount (mixed method), (2) a method in which each aqueous solution of a compound that becomes a precursor of each oxide is mixed into each other, then the resultant mixture is pH-adjusted to be coprecipitated as a hydroxide, and the resultant hydroxide is dried and sintered (coprecipitation method), (3) a method in which an aqueous solution into which another compound precursor has been dissolved is mixed into an oxide of (1) or (2), and then the resultant mixture is dried and sintered (impregnation method), and the like are suitable.

Further, the temperature at the time of drying is, from the viewpoint of the convenience of the use, preferably 50 to 250° C., and more preferably 80 to 200° C. In addition, the temperature at the time of sintering is, from the viewpoint of the convenience of the use, preferably 200 to 1100° C., and more preferably 300 to 1000° C.

In more detail, for example, a method in which an aluminum source, a zirconium source and a silicon source are dissolved into water, then mixed, and the resultant mixture is pH-adjusted to be coprecipitated as a hydroxide, and then the resultant hydroxide is dried and calcined (coprecipitation method); a method in which any one of an aluminum source, a zirconium source and a silicon source is used as a solid source, and the other is used as an aqueous solution, the one is impregnated with the aqueous solution, and then the impregnated resultant is dried and sintered (impregnation method); or a method in which each solid source is mixed, and the resultant mixture is dried and sintered (mixed method) can be used.

The calcination may be performed in one stage, or may be performed in multiple stages. The calcination method and conditions in a case where the calcination is performed in multiple stages are not particularly limited, however, for example, in a case where the calcination is performed in three stages, it is preferred that the sintering is performed at a temperature of 80° C. to 150° C. for 30 minutes to 10 hours, further at a temperature of 250° C. to 550° C. for 30 minutes to 8 hours, and furthermore at a temperature of 600° C. to 750° C. (Examples: 700° C.) for 30 minutes to 7 hours. By thus calcination in multiple stages, the moisture can gradually be removed at a low temperature, and an effect of helping crystal formation of fine particles at a high temperature is exerted.

(Other Additive Components)

In the present invention, other additive components can also be added as long as the effect of a catalyst of the present invention is not lowered. For example, as a component capable of adsorbing a hydrocarbon (HC) and a nitrogen oxide (NOx) in exhaust gas, zeolite can be used.

As the kind of zeolite, any one of a natural product and a synthetic product may be used, for example, A type, X type, Y type, L type, β type, ZSM type, ferrierite type, linde type, faujasite type or the like can be used. Further, in the present invention, zeolite is distinguished from the base material A, and the base material B.

In addition, in order to improve the specific surface area and heat resistance of a catalyst, a fire-resistant inorganic oxide that is usually used as an exhaust gas catalyst can also be contained. However, in such a case, the fire-resistant inorganic oxide is used as the one distinguished from the base material A, and the base material B. Further, an alkali metal, and an alkali earth metal can also be added for NOx adsorption.

Specific examples of the fire-resistant inorganic oxide as the one distinguished from the base material A, and the base material B include for example, a metal oxide having a high specific surface area, which is commonly used for a catalyst for purifying exhaust gas.

Further, the content of other additive components (preferably, zeolite) is not also particularly limited, however, preferably 1 to 150 g, more preferably 5 to 100 g and still more preferably 40 to 60 g per liter of support (Claim 10). This is because in a case where the content is less than 1 g, there is a fear that an effect of adding other additive components becomes small, and on the other hand, when the content exceeds 150 g, there is a fear that an effect depending on the addition becomes small.

—Production Method of Catalyst for Purifying Exhaust Gas—

A catalyst according to the present invention is basically composed of a noble metal, an oxide of a base material A, and (an oxide of) a base material B. However, a catalyst for purifying exhaust gas of the present invention is obtained by preferably supporting the noble metal, the oxide of a base material A, and the oxide of a base material B on a support.

In this case, as the support, a support that is used as a support in the field can be used without any limitation, however, from the viewpoint of the catalyst strength, a three-dimensional structure body is preferably used.

As the three-dimensional structure body, for example, a heat resistant support such as a honeycomb support having a triangular, quadrilateral, or hexagonal through hole can be used. In addition, as the three-dimensional structure body, an integrally molded body (monolithically-fabricated structured body) is preferred, for example, a monolithic support, a metal honeycomb support, a plugged honeycomb support having a filter function of a diesel particulate filter or the like, a punching metal, or the like is preferably used. Further, it is not necessarily required to use a monolithic three-dimensional structure body, and for example, a pellet support or the like can also be used. Furthermore, a spherical, or corrugated support can be used. As the material for the support, a ceramic, or a metal can be used, and as the ceramic, cordierite, mullite, SiC or the like can be used.

As the monolithic support, usually a support referred to as a ceramic honeycomb support may be used, in particular, a support made of cordierite, mullite, α-alumina, silicon carbide, silicon nitride or the like is preferred. Among them, a support made of cordierite (a cordierite support) is particularly preferred. In addition, a monolithic structure body or the like, which is obtained by using an oxidation-resistant and heat-resistant metal containing stainless steel, a Fe—Cr—Al alloy and the like, can be used.

These monolithic supports are produced by an extrusion molding method, a method of winding and hardening a sheet-shaped element or the like. The shape of the through port (gas passing port, cell shape) may be any one of hexagonal (honeycomb), quadrilateral, triangular or corrugated (corrugation shape). The monolithic support can sufficiently be used as long as being 100 to 1200 cells per cross-sectional square inch of support, and the cells are preferably 200 to 900 cells, more preferably 200 to 600 cells, and furthermore preferably 250 to 500 cells. Further, a method for supporting a catalyst of the present invention on a three-dimensional structure body is not particularly limited. For example, a method in which wash coating and the like are performed and then calcination is performed can be used.

Preferred examples of the method for producing a catalyst of the present invention include:

(1) a method in which an aqueous solution of a noble metal, and a base material A and a base material B are mixed, the mixture was wet-ground to obtain a slurry, then the slurry is brought into contact with a three-dimensional structure body, the excess slurry is removed, and the resultant is dried and calcined;

(2) a method in which a base material A and a base material B are wet-ground to obtain a slurry, then the slurry is brought into contact with a three-dimensional structure body, the excess slurry is removed, and the resultant is dried and calcined, and further brought into contact with an aqueous solution of a noble metal, the excess solution is removed, and the resultant is dried and calcined;

(3) a method in which a base material A and a solution of a noble metal are mixed, the mixture is dried and calcined to obtain powders, the powders and a base material B are wet-ground to obtain a slurry, then the slurry is brought into contact with a three-dimensional structure body, the excess slurry is removed, and the resultant is dried and calcined;

(4) a method in which a base material B and a solution of a noble metal are mixed, the mixture is dried and calcined to obtain powders, the powders and a base material A are wet-ground to obtain a slurry, then the slurry is brought into contact with a three-dimensional structure body, the excess slurry is removed, and the resultant is dried and calcined;

(5) a method in which a base material A, a base material B, and a solution of a noble metal are mixed, the mixture is dried and calcined to obtain powders, the powders are wet-ground to obtain a slurry, then the slurry is brought into contact with a three-dimensional structure body, the excess slurry is removed, and the resultant is dried and calcined; and the like, however, these methods can appropriately be changed to be used.

A slurry is wash coated on a three-dimensional structure body that is a support such as cordierite or the like, then the resultant may be subjected to calcination in multiple stages, and a catalyst in which a catalyst component has been coated on a cordierite support may be obtained. Further, in each calcination process, the environment may appropriately be changed. For example, in a case of performing the calcination in two stages, in the first calcination process, any atmosphere may be used as long as the calcination is performed, and the sintering may also be performed in an atmosphere having less oxygen, or in the air, however, from the viewpoint of the handleability, the calcination is preferably performed at a temperature of 250° C. to 550° C. for 30 minutes to 8 hours in the air or the like. Further, in the second calcination process, from the viewpoint of promoting the metalization of a noble metal, the calcination is preferably performed at a temperature of 250° C. to 550° C. for 30 minutes to 8 hours in a mixed gas of hydrogen and nitrogen, or the like.

—Exhaust Gas Purification Method—

The second of the present invention is an exhaust gas purification method, using the first catalyst for purifying exhaust gas of the present invention.

As the exhaust gas to which a catalyst according to the present invention is subjected, any exhaust gas can be used as long as containing CO, and preferably, exhaust gas discharged from a gasoline engine, or a diesel engine is used. The CO concentration in exhaust gas is not particularly limited, however, preferably 10 to 50,000 ppm by volume, more preferably 50 to 15,000 ppm by volume, and still more preferably 50 to 5,000 ppm by volume. Further, even if HC, and NOx are contained in exhaust gas other than the CO, the treatment can be performed, in such a case, the treatment can more efficiently be performed by using a catalyst into which the above-described additive components have been added.

The HC concentration in exhaust gas is not particularly limited, however, preferably 1 to 50000 ppm by volume, more preferably 10 to 10000 ppm by volume, and furthermore preferably 50 to 1000 ppm by volume.

The NO concentration in exhaust gas is not particularly limited, however, preferably 1 to 10000 ppm by volume, more preferably 10 to 5000 ppm by volume, and still more preferably 20 to 1000 ppm by volume.

Further, in a case where a particulate component (PM) is contained in exhaust gas, a three-dimensional structure body having a filter function is preferably used. The contact is preferably performed at a space velocity of preferably 1,000 to 500,000 hr$^{-1}$, and more preferably 5,000 to 150,000 hr$^{-1}$, and at a gas velocity of preferably 0.1 to 8.5 m/second, and more preferably 0.2 to 4.2 m/second.

In addition, other catalysts can also be used in combination, for example, in a case of the exhaust gas in which HC is contained in a large amount, an oxidation catalyst, and in a case where the exhaust gas repeats rich and lean, a three way catalyst, can also be used in combination.

EXAMPLES

The effects of the present invention will be described using the following Examples and Comparative Examples. However, the technical scope of the present invention is not limited only to the following Examples.

Example 1

6917.0 g of aluminum nitrate nonahydrate (Al(NO$_3$)$_3$.9H$_2$O) was completely dissolved into 4.5 L (liter, hereinafter, referred to as "L") of deionized water, and further into the mixture, 260.8 g of a zirconyl nitrate aqueous solution (concentration of 20% by weight in terms of ZrO$_2$) was added and thoroughly stirred to prepare a mixed aqueous solution. The mixed aqueous solution was added dropwise into a 10 L of aqueous solution at a temperature of 25° C., which had been adjusted to pH10 with 106.0 g of sodium metasilicate, and ammonia. While being added dropwise, the solution was adjusted so that the pH thereof is in the range of 7 to 10. The generated precipitate was filtered out, and washed thoroughly with deionized water, then the resultant precipitate was dried at 120° C. for 8 hours, and sintered at 400° C. for 5 hours and at 700° C. for 5 hours to obtain alumina-zirconia-silica (90% by weight of alumina, 5% by weight of zirconia, and 5% by weight of silica, and the specific surface area of 200 m$^2$/g).

Further, as described above, an oxide of the zirconium is preferably 0.1 to 20% by weight when total weight of the base material A in terms of oxide is set as 100% by weight. In Example 1, an oxide of the zirconium is 5/(90+5)×100=5.26% by weight, and it can be understood that the oxide of the zirconium is within the preferred range. Hereinafter, calculation is performed in the same manner.

Next, with 1396.45 g of a mixed aqueous solution obtained by the dilution of a dinitrodiammine platinum aqueous solution in an amount equivalent to 33.7 g of platinum and a palladium nitrate solution in an amount equivalent to 16.85 g of palladium with deionized water, 2057.5 g of the above-described alumina-zirconia-silica was impregnated, then the resultant alumina-zirconia-silica was dried at 120° C. for 8 hours to obtain powders, and further, the powders were calcined at 500° C. for 1 hour to obtain alumina-zirconia-silica on which a noble metal had been supported (noble metal supported alumina-zirconia-silica). The noble metal supported alumina-zirconia-silica, 578.8 g of beta-zeolite (the ratio of silica/alumina (mole ratio) of 35, and the average particle diameter of 0.6 μm), and 2000 mL (milliliter) of deionized water were mixed, and the mixture was wet-ground to obtain a slurry.

The slurry was wash coated on a cordierite support having a diameter of 103 mm, a length of 130 mm, and a volume of 1.1 L (the number of cells: 600 cells per square inch of cross-sectional area), the resultant support was dried at 150° C. for 5 minutes, then sintered at 500° C. for 1 hour in the air, and further treated at 500° C. for 3 hours under the airflow of 5% hydrogen and 95% nitrogen to obtain a catalyst a in which 148.2 g of catalyst components (1.8 g of platinum, 0.9 g of palladium, 105.5 g of alumina-zirconia-silica, and 40 g of beta-zeolite) per liter of support had been coated on a cordierite support.

Further, in addition to the catalyst a, a catalyst in which the amount of SiO$_2$ had been changed was prepared, and the effect of SiO$_2$ was investigated (see FIG. 1). As a catalyst, in Example 1, the amount of SiO$_2$ was changed to 1% by weight, 10% by weight, and 20% by weight, a catalyst was obtained in the same manner as in Example 1. In addition, the increase or decrease of the amount of SiO$_2$ was supplemented with the increase or decrease of the amount of Al$_2$O$_3$. In FIG. 1, the conversion rate of CO is shown on the vertical axis, and % amount of SiO$_2$ is shown on the horizontal axis.

Example 2

6917.0 g of aluminum nitrate nonahydrate (Al(NO$_3$)$_3$.9H$_2$O) was completely dissolved into 4.5 L of deionized water, and further into the mixture, 269.5 g of a zirconyl nitrate aqueous solution (concentration of 20% by weight in terms of ZrO$_2$) and 89.9 g of a sulfuric acid solution of titanium sulfate (concentration of 30% by weight in terms of TiO$_2$) were added and thoroughly stirred to prepare a mixed aqueous solution. The mixed aqueous solution was added dropwise into a 10 L of aqueous solution at a temperature of 25° C., which had been adjusted to pH10 with 109.1 g of sodium metasilicate, and ammonia. While being added dropwise, the solution was adjusted so that the pH thereof is in the range of 7 to 10. The generated precipitate was filtered out, and washed thoroughly with deionized water, then the resultant precipitate was dried at 120° C. for 8 hours, and calcined at 400° C. for 5 hours and at 700° C. for 5 hours to obtain alumina-zirconia-titania-silica (87.5% by weight of alumina, 5% by weight of zirconia, 2.5% by weight of titania, and 5% by weight of silica, and the specific surface area of 180 m$^2$/g).

Further, as described above, an oxide of the titanium is preferably 1.5 to 10% by weight when total weight of the base material A in terms of oxide is set as 100% by weight. In also Example 2, in the same manner, an oxide of the titanium is 2.5/(87.5+5+2.5)×100=2.6% by weight, and it can be understood that the oxide of the titanium is within the preferred range. Hereinafter, calculation is performed in the same manner.

Next, with 1475.45 g of a mixed aqueous solution obtained by the dilution of a dinitrodiammine platinum aqueous solution in an amount equivalent to 22.7 g of platinum and a palladium nitrate solution in an amount equivalent to 11.33 g of palladium with deionized water, 2025.8 g of the above-described alumina-zirconia-titania-silica was impregnated, then the resultant alumina-zirconia-titania-silica was dried at 120° C. for 8 hours to obtain powders, and further the powders were calcined at 500° C. for 1 hour to obtain alumina-zirconia-titania-silica on which a noble metal had been supported (noble metal supported alumina-zirconia-titania-silica). The noble metal supported alumina-zirconia-titania-silica, 600.5 g of beta-zeolite (the ratio of silica/alumina (mole ratio) of 35, and the average particle diameter of 0.6 μm), and 2000 mL of deionized water were mixed, and the mixture was wet-ground to obtain a slurry. The slurry was wash coated on a cordierite support having a diameter of 103 mm, a length of 130 mm, and a volume of 1.1 L (the number of cells: 600 cells per square inch of cross-sectional area), the resultant support was dried at 150° C. for 5 minutes, then calcined at 500° C. for 1 hour in the air, and further treated at 500° C. for 3 hours under the airflow of 5% hydrogen and 95% nitrogen to obtain a catalyst b in which 147.3 g of catalyst components (1.2 g of platinum, 0.6 g of palladium, 105.5 g of alumina-zirconia-titania-silica, and 40 g of beta-zeolite) per liter of support had been coated.

Figure 2:
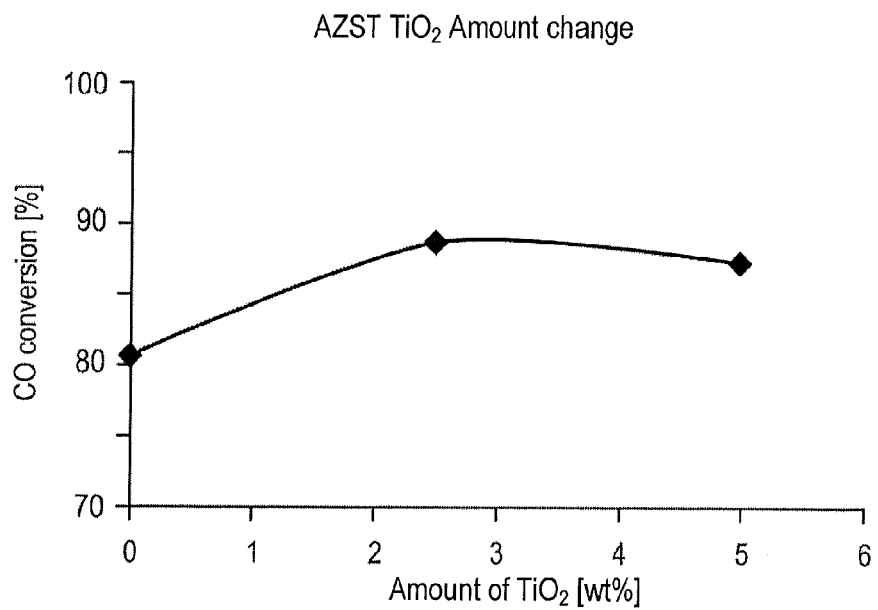
FIG. 2 is a graph showing the dependency of an addition amount of titania.

In addition to the catalyst b, a catalyst in which the amount of $TiO_2$ had been changed was prepared, and the dependency of the addition amount of $TiO_2$ in a base material A was investigated (see FIG. 2). As a catalyst, in Example 2, the amount of $TiO_2$ was changed to 5% by weight, and to 0% by weight as a comparative example, a catalyst was obtained in the same manner as in Example 2. In addition, the increase or decrease of the amount of $TiO_2$ was supplemented with the increase or decrease of the amount of $Al_2O_3$. In FIG. 2, the conversion rate of CO is shown on the vertical axis, and % amount of $TiO_2$ is shown on the horizontal axis.

Example 3

6917.0 g of aluminum nitrate nonahydrate (Al$(NO_3)_3$.$9H_2O$) was completely dissolved into 4.5 L of deionized water, and further into the mixture, 259.0 g of a zirconyl nitrate aqueous solution (concentration of 20% by weight in terms of $ZrO_2$) 85.9 g of a sulfuric acid solution of titanium sulfate (concentration of 30% by weight in terms of $TiO_2$), and 25.9 g of cerium nitrate hexahydrate were added and thoroughly stirred to prepare a mixed aqueous solution. The mixed aqueous solution was added dropwise into a 10 L of aqueous solution at a temperature of 25° C., which had been adjusted to pH10 with ammonia. While being added dropwise, the solution was adjusted so that the pH thereof is in the range of 7 to 10. The generated precipitate was filtered out, and washed thoroughly with deionized water, then the resultant precipitate was dried at 120° C. for 8 hours, and calcined at 400° C. for 5 hours and at 700° C. for 5 hours to obtain alumina-zirconia-titania-ceria (91.5% by weight of alumina, 5% by weight of zirconia, 2.5% by weight of titania, and 1% by weight of ceria, and the specific surface area of 151 m$^2$/g).

Next, with 1482.1 g of a mixed aqueous solution obtained by the dilution of a dinitrodiammine platinum aqueous solution in an amount equivalent to 24.5 g of platinum and a palladium nitrate solution in an amount equivalent to 12.3 g of palladium with deionized water, 2071.9 g of the above-described alumina-zirconia-titania-ceria was impregnated, then the resultant alumina-zirconia-titania-ceria was dried at 120° C. for 8 hours to obtain powders, and further the powders were sintered at 500° C. for 1 hour to obtain alumina-zirconia-titania-ceria on which a noble metal had been supported (noble metal supported alumina-zirconia-titania-ceria). This noble metal supported alumina-zirconia-titania-ceria, 591.6 g of beta-zeolite (the ratio of silica/alumina (mole ratio) of 35, and the average particle diameter of 0.6 μm), and 2000 mL of deionized water were mixed, and the mixture was wet-ground to obtain a slurry. The slurry was wash coated on a cordierite support with a volume of 0.0303 L, which had been cut into a cylindrical column having a diameter of 24 mm, and a length of 67 mm, (the number of cells: 400 cells per square inch of cross-sectional area), the resultant support was dried at 150° C. for 5 minutes, then sintered at 500° C. for 1 hour in the air, and further treated at 500° C. for 3 hours under the airflow of 5% hydrogen and 95% nitrogen to obtain a catalyst c in which 147.45 g of catalyst components (1.3 g of platinum, 0.65 g of palladium, 105.5 g of alumina-zirconia-titania-ceria, and 40 g of beta-zeolite) per liter of support had been coated.

Figure 3:
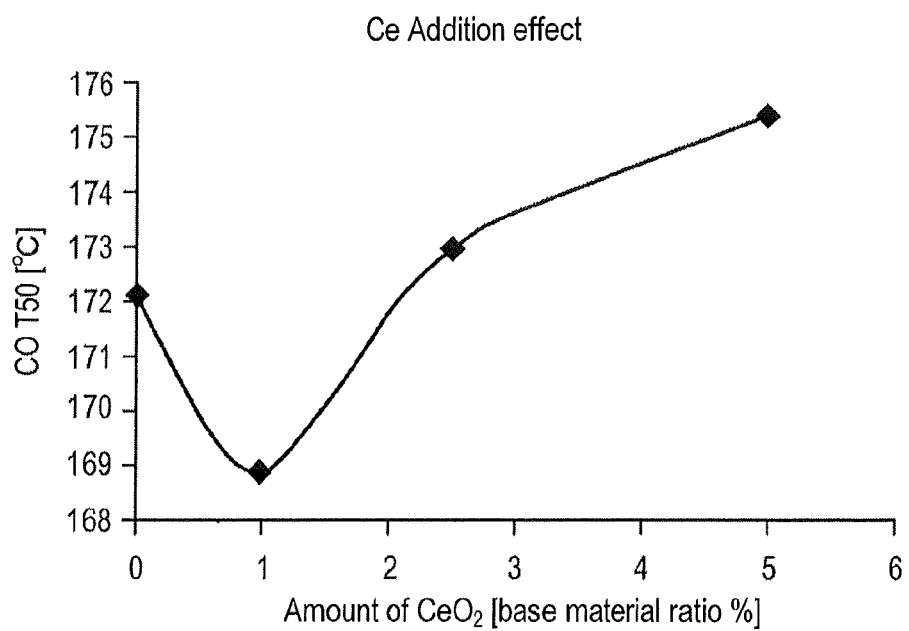
FIG. 3 is a graph showing the CO purification in evaluation test 2 of a catalyst in which cerium is added.

In addition to the catalyst c, a catalyst in which the amount of $CeO_2$ had been changed was prepared, and the effect of $CeO_2$ was investigated (FIG. 3). As a catalyst, in Example 3, the amount of $CeO_2$ was changed to 2.5% by weight, and 5% by weight, and the amount of $CeO_2$ was changed to 0% by weight as a comparative example, a catalyst was obtained in the same manner as in Example 3. In addition, the increase or decrease of the amount of $CeO_2$ was supplemented with the increase or decrease of the amount of $Al_2O_3$. In FIG. 3, also shown in the following "evaluation test", however, the temperature at a time point when the CO conversion rate becomes 50% (CO T50° C.) is shown on the vertical axis, and % amount of $CeO_2$ is shown on the horizontal axis. It is indicated that as the temperature is lower, the CO ignitability (low-temperature combustion) can be more favorable.

Example 4

In Example 3, except that 26.2 g of praseodymium nitrate hexahydrate was used in place of cerium nitrate hexahydrate, alumina-zirconia-titania-praseodia (91.5% by weight of alumina, 5% by weight of zirconia, 2.5% by weight of titania, and 1% by weight of praseodia, and the specific surface area of 152 m$^2$/g) was obtained in the same manner as in Example 3, and a catalyst d was obtained in the same manner as in Example 3.

In addition to the catalyst d, a catalyst in which the amount of $Pr_6O_{11}$ had been changed was prepared, and the effect of $Pr_6O_{11}$ was investigated (Table 1). As a catalyst, in Example 4, the amount of $Pr_6O_{11}$ was changed to 2% by weight and 0% by weight, and a catalyst was obtained in the same manner as in Example 4. In addition, the increase or decrease of the amount of $Pr_6O_{11}$ was supplemented with the increase or decrease of the amount of $Al_2O_3$. Table 1 showed a temperature, and % amount of $Pr_6O_{11}$ at a time point when the CO conversion rate becomes 50%. It is indicated that as the temperature is lower, the CO ignitability (low-temperature combustion) can be more favorable.

Example 5

In Example 3, 141.5 g of lanthanum nitrate hexahydrate was used in place of cerium nitrate hexahydrate of a base material B, the amounts of a zirconyl nitrate aqueous solution, and a sulfuric acid solution of titanium sulfate were changed, and alumina-zirconia-titania-lanthana (87.5% by weight of alumina, 5% by weight of zirconia, 2.5% by weight of titania, and 5% by weight of lanthana, and the specific surface area of 154 m$^2$/g) was adjusted to prepare a catalyst.

Next, in Example 3, except that alumina-zirconia-titania-ceria was changed to alumina-zirconia-titania-lanthana (87.5% by weight of alumina, 5% by weight of zirconia, 2.5% by weight of titania, and 5% by weight of lanthana), a catalyst e was obtained in the same manner.

In addition to the catalyst e, a catalyst in which the amount of $La_2O_3$ had been changed was prepared, and the effect of $La_2O_3$ was investigated (Table 1). As a catalyst, in Example 5, the amount of $La_2O_3$ was changed to 0% by weight, 1% by weight, and 10% by weight, and a catalyst was obtained in the same manner as in Example 5. In addition, the decrease of the amount of $La_2O_3$ was supplemented with the increase of the amount of $Al_2O_3$. Table 1 showed a temperature, and % amount of $La_2O_3$ at a time point when the CO conversion rate becomes 50%. It is indicated that as the temperature is lower, the CO ignitability (low-temperature combustion) can be more favorable.

Example 6

6917.0 g of aluminum nitrate nonahydrate (Al($NO_3$)$_3$·9$H_2O$) was completely dissolved into a 4.5 L of deionized water, and further into the mixture, 266.7 g of a zirconyl nitrate aqueous solution (concentration of 20% by weight in terms of $ZrO_2$), and 26.6 g of cerium nitrate hexahydrate were added and thoroughly stirred to prepare a mixed aqueous solution. The mixed aqueous solution was added dropwise into a 10 L of aqueous solution at a temperature of 25° C., which had been adjusted to pH10 with 139.2 g of sodium metasilicate, and ammonia. While being added dropwise, the solution was adjusted so that the pH thereof is in the range of 7 to 10. The generated precipitate was filtered out, and washed thoroughly with deionized water, then the resultant precipitate was dried at 120° C. for 8 hours, and the resultant precipitate was sintered at 400° C. for 5 hours and at 700° C. for 5 hours to obtain alumina-zirconia-silica-ceria (89% by weight of alumina, 5% by weight of zirconia, 5% by weight of silica, and 1% by weight of ceria, and the specific surface area of 230 m$^2$/g). Further, as a catalyst, in Example 6, the amount of $CeO_2$ was changed to 0% by weight, and a catalyst was obtained in the same manner as in Example 6. In addition, the decrease of the amount of $CeO_2$ was supplemented with the increase of the amount of $Al_2O_3$.

Further, as in Example 6, when two or more kinds of base material B are used, it is considered to be "when base material B is silicon" and "when base material B is cerium". That is, silica is 5% by weight, and ceria is 1% by weight, therefore, the descriptions of "(a) 0.01 to 8% by weight when the base material B is silicon", and "(b) 0.01 to 2% by weight when the base material B is cerium", in the present invention are satisfied.

Next, with 1482.1 g of a mixed aqueous solution obtained by the dilution of a dinitrodiammine platinum aqueous solution in an amount equivalent to 24.5 g of platinum and a palladium nitrate solution in an amount equivalent to 12.3 g of palladium with deionized water, 2071.9 g of alumina-'zirconia-silica-ceria was impregnated, then the resultant alumina-zirconia-silica-ceria was dried at 120° C. for 8 hours to obtain powders, and further the powders were calcined at 500° C. for 1 hour to obtain alumina-zirconia-silica-ceria on which a noble metal had been supported (noble metal supported alumina-zirconia-silica-ceria). This noble metal supported alumina-zirconia-silica-ceria, 607.2 g of beta-zeolite (the ratio of silica/alumina (mole ratio) of 35, and the average particle diameter of 0.6 μm), and 2000 mL of deionized water were mixed, and the mixture was wet-ground to obtain a slurry. The slurry was wash coated on a cordierite support with a volume of 0.0303 L, which had been cut into a cylindrical column having a diameter of 24 mm, and a length of 67 mm, (the number of cells: 400 cells per square inch of cross-sectional area), the resultant support was dried at 150° C. for 5 minutes, then calcined at 500° C. for 1 hour in the air, and further treated at 500° C. for 3 hours under the airflow of 5% hydrogen and 95% nitrogen to obtain a catalyst f in which 147.45 g of catalyst components (1.3 g of platinum, 0.65 g of palladium, 105.5 g of alumina-zirconia-silica-ceria, and 40 g of beta-zeolite) per liter of support had been coated. The evaluation results are shown in Table 1.

Comparative Example 1

Except that a silicon source was not used in Example 1, a comparative catalyst h was obtained in the same manner as in Example 1. The results of catalyst h were shown as 0% by weight of the amount of $SiO_2$ in FIG. 1, which had been changed.

(Evaluation Test)

Each of the obtained catalysts was exposed to engine exhaust gas at 800° C. for 20 hours in Example 2, and to engine exhaust gas at 700° C. for 50 hours in the other Examples and Comparative Examples, and then was subjected to an ignition test of CO.

The above-described temperature measured at the time when the CO conversion rate reaches 50% by the increase of the exhaust gas temperature from 100° C. at a speed of 20° C./minute at an exhaust gas concentration shown below is shown on the vertical axis (CO T50 [° C.]), the base material ratio of each base material B is shown on the horizontal axis, and a graph is obtained. The graph indicates that the base material B provides the CO ignitability.

It is indicated that as the temperature is lower, the CO ignitability is higher. Further, the catalyst is a comparative catalyst h in a case where the base material B is zero % by weight. In addition, catalysts c and h are illustrated. The other catalysts are shown in Table 1.

As the exhaust gas concentration conditions, the conditions under which model gas is used were set as follows: the CO concentration is 1000 ppm by volume; the NO concentration is 80 ppm by volume; the HC concentration is 350 ppm by volume (concentration in terms of 1 carbon atom); the $CO_2$ concentration is 6%; the oxygen concentration is 12%; the $H_2O$ is 6%; and the rest is nitrogen; and the space velocity is 40,000 hr$^{-1}$.

As the conditions under which an engine is used, CO purification characteristics of a catalyst were compared by using an overall CO purification rate in a variable travelling mode in which the exhaust gas temperature is repeatedly increased and decreased. The conditions were set as follows: the CO concentration is 100 to 1400 ppm by volume; the NOx is 50 to 1100 ppm by volume; the HC is 100 to 650 ppm by volume (concentration in terms of 1 carbon atom); and the space velocity is 30,000 to 100,000 hr$^{-1}$.

TABLE 1

| Base material B | $Pr_6O_{11}$ | | | $La_2O_3$ | | | | $SiO_2$ & $CeO_2$ | |
|---|---|---|---|---|---|---|---|---|---|
| Base material ratio (%) | 0 | 1 | 2 | 0 | 1 | 5 | 10 | 5&0 | 5&1 |
| COT50 (%) | 174 | 168 | 180 | 174 | 164 | 154 | 172 | 178 | 174 |

INDUSTRIAL APPLICABILITY

The present invention can be used for a catalyst for purifying exhaust gas, and a purification method, and particularly is suitable for a CO-containing exhaust gas treatment.

In addition, the present application is based on the Japanese Patent Application No. 2013-034837 filled on Feb. 25, 2013, and the disclosed content thereof is referred to, and incorporated as a whole.

The invention claimed is:

1. A catalyst for purifying exhaust gas, comprising:
   a noble metal;
   an oxide comprising as a base material A at least two kinds of elements selected from the group consisting of aluminum, zirconium and titanium; and
   an oxide comprising as a base material B at least one kind of element selected from the group consisting of silicon, cerium, praseodymium and lanthanum; wherein
   a base material ratio represented by Equation (X):

[Mathematical Expression 1]

$$\frac{\text{Weight of base material } B \text{ in terms of oxide}}{\text{Weight in base material } A \text{ in terms of oxide} + \text{Weight of base material } B \text{ in terms of oxide}} \times 100 \quad (X)$$

is
   (a) 0.01 to 8% by weight when the base material B is silicon,
   (b) 0.01 to 2% by weight when the base material B is cerium,
   (c) 0.01 or more to less than 2% by weight when the base material B is praseodymium, and
   (d) 0.01 to 10% by weight when the base material B is lanthanum,
   wherein
   an oxide of the aluminum as the base material and
   an oxide of the zirconium as the base material A,
   are contained, wherein the oxide of the zirconium is 0.1 to 20% by weight when a total weight of the base material A in terms of oxide is set as 100% by weight.

2. The catalyst for purifying exhaust gas according to claim 1, further comprising:
   an oxide of the titanium as the base material A.

3. The catalyst for purifying exhaust gas according to claim 2, wherein
   the oxide of the titanium is 0.1 to 20% by weight when total weight of the base material A in terms of oxide is set as 100% by weight.

4. An exhaust gas purification method,
   using the catalyst for purifying exhaust gas according to claim 1.

* * * * *